UNITED STATES PATENT OFFICE.

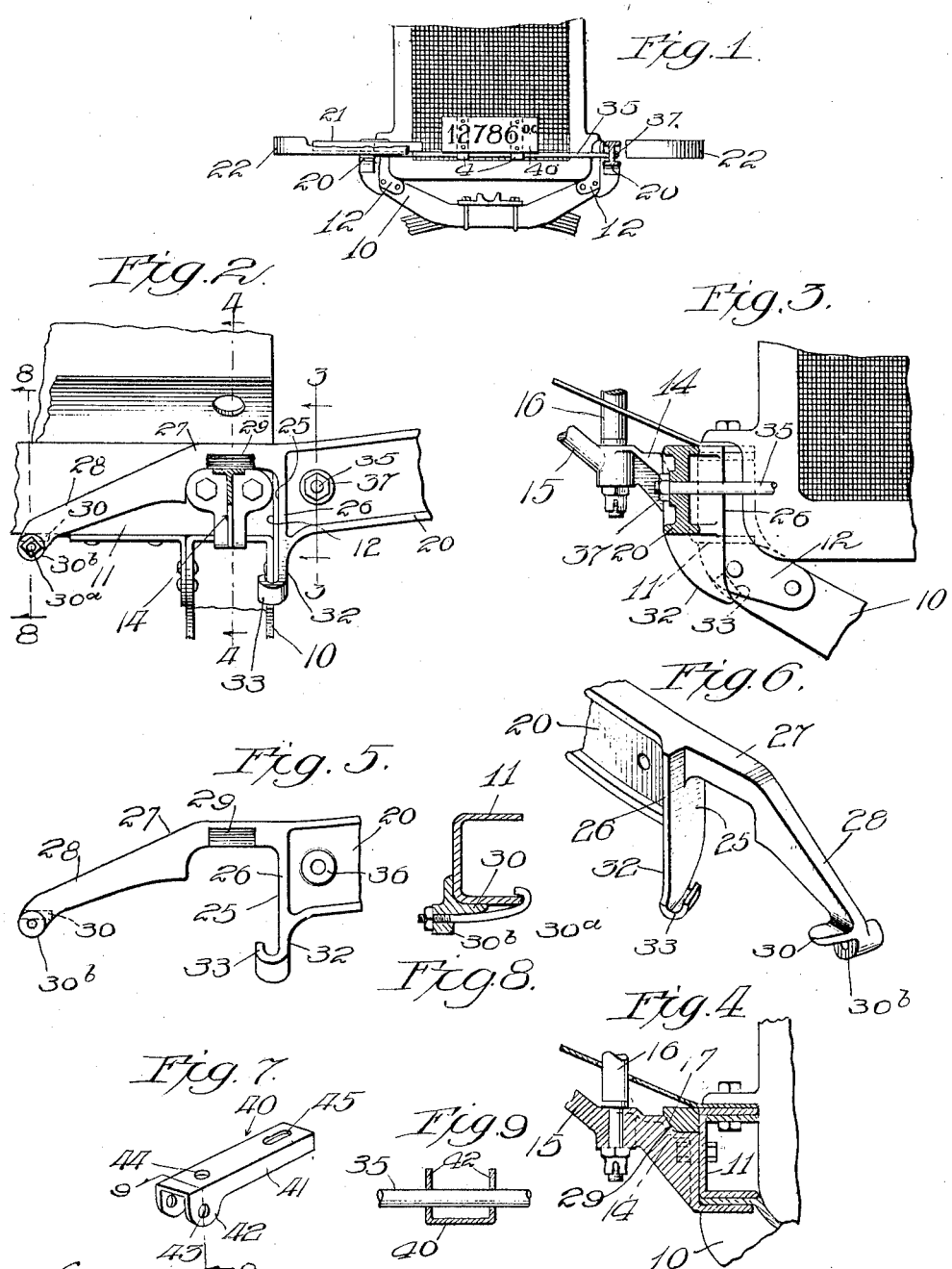

THOMAS I. DUFFY, OF OAK PARK, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,373,954. Specification of Letters Patent. Patented Apr. 5, 1921.

Application filed October 17, 1917. Serial No. 197,055.

*To all whom it may concern:*

Be it known that I, THOMAS I. DUFFY, a citizen of the United States, residing at Oak Park, in the county of Cook and the State of Illinois, have invented certain new and useful Improvements in Automobile-Bumpers, of which the following is a specification, reference being had to the accompanying drawings, forming a part thereof.

This invention relates to improvements in bumpers for automobiles and similar vehicles, which may be attached to the front or rear of the vehicle, and refers more specifically to an attaching bracket or device by which a bumper may be attached to vehicle frames of that class in which no part of the frame of the vehicle projects forwardly beyond the radiator line, and to means for fixing the bumper brackets on the frame. The invention relates also to an improved license tag bracket for supporting a license tag on the vehicle.

Among the objects of the invention is to provide an exceedingly simple and economical bumper attaching and supporting device which may be readily applied to standard automobile frames, and which is so constructed and arranged as to be attached to the vehicle by very simple attaching means which reliably and rigidly fix the fastening brackets or devices to the frame.

A further object of the invention resides in the provision of an exceedingly simple and effective means for attaching a license tag bracket to the vehicle.

The invention consists in the combination and arrangement of the parts shown in the drawings and described in the specifications, and is pointed out in the appended claims.

I have herein shown my improvements as applied to the Ford type of vehicle, as indicating one specific embodiment of the invention, but it will be understood that the invention may be adapted to other types of vehicle of that kind wherein no projecting parts of the frame are extended in front of the radiator for connection of the parts thereto, without departure from the spirit of my invention.

In said drawings:

Figure 1 is a fragmentary front elevation of an automobile showing my improvements applied thereto.

Fig. 2 is a fragmentary side elevation of the parts.

Fig. 3 is a cross-section at line 3—3 on Fig. 2.

Fig. 4 is a cross-section at line 4—4 on Fig. 2.

Figs. 5 and 6 are perspective views of the rear end of the bumper attaching bracket.

Fig. 7 is a perspective view of a license tag bracket embodying my invention.

Fig. 8 is a detail section at the line 8—8 on Fig. 2.

Fig. 9 is a detail section at the line 9—9 on Fig. 7.

The frame of the particular type of vehicle shown herein embraces a front transverse, inverted arch channel bar 10 to which the front ends of the side members 11 of the frame are attached, as by means of fittings 12. 14 designates a fitting which is attached to the side frame member 11 and, in the completed organization, comprises a supporting member 15 for the fender and a support for a lamp bracket 16. The said fitting extends laterally and upwardly from the side member of the frame, and the configuration thereof is such as to provide between the same and the frame a space 17.

20—20 designate bumper supporting brackets which are attached at their rear ends to the frame and carry at their forward ends, through the medium of impact resistance springs 21, the bumper bar 22. The construction of said springs and the bumper bar is like that shown in my co-pending application for U. S. Letters Patent, Serial No. 142,401, and need not hereby be further referred to, except to state that the rearwardly directed terminals of said spring overlap and are bolted to the forward ends of said brackets.

Said brackets as herein shown, and preferably, are of I-cross-section. Each of said brackets is formed at its rear end with a bearing face 25 which abuts against the forward face of the fitting 12, the bracket being flanged at 26 to give suitable width to said bearing face. Each bracket is also provided in rear of said bearing face 25 with a balancing arm, which comprises a generally horizontal portion 27 and a downwardly inclined portion 28. The horizontal portion of said balancing arm is fitted within the space 17 between the fitting 14 and the side member 11 of the frame. Said horizontal portion of balancing arm is chamfered at 29 to fit the inclined, upper face of the bracket and the balancing arm fits at its inner side flat against the side face of the side frame member 11 of the vehicle. The balancing arm is provided at its extreme end with an inturned lug 30 forming an abutment which is adapted to engage under the side of the side member 11 in the manner most clearly indicated in Fig. 8 so as to thereby hold the bracket from tilting downwardly at its forward end.

The bearing portion 25 of the bracket is provided with a downward extension 32, which terminates at its lower end in a hook 33, that engages under the lower edge of the front flange of the channel frame bar 10, one of the functions of said hook being to prevent the bumper bracket from rising under the influence of an upwardly directed blow against the bumper bar. The bottom of said terminal hook 33 is inclined downwardly and inwardly to correspond to the inclination of the lower edge of the front flange of the frame bar 10.

The two brackets for each equipment are fastened to the frame through the medium of a single fastening rod 35 which extends between and clamps the two brackets together, said rod serving, in connection with the lugs 33 and 30, to rigidly bind the brackets to the frame. As herein shown, each bracket is provided with a hollow boss 36 through which the rod extends, and the rod is threaded at its ends to receive nuts 37, which act against the outer faces of the brackets, or washers interposed between said faces and nuts, to draw the rear ends of the brackets together and against the side frame members of the vehicle.

By reason of the inclination of the terminal hooks 33 to correspond to the inclination of the front flanges of the frame bar 10, it will be observed that the pressure exerted on the rear ends of the brackets through the threaded rod 35 to draw them together has the further effect to exert a downward pull on the brackets and to thereby firmly seat the horizontal portions 27 of the brackets on the fittings 14. This downward pull, due to the coöperation of the inclined hooks 33 with the front bar 10 of the frame, is resisted by the interlocking engagements of the lugs 30 with the under sides of the side members of the frame, and the resultant of the forces is to bind and securely hold the brackets against all parts of the bearing surfaces of the frame and fender fittings.

The rod 35 by which the brackets are drawn together may conveniently serve as a support for a license tag bracket. A convenient form of bracket is shown in Figs. 1, 7 and 9. It comprises two channel section bracket members 40, the flanges 41 of which are enlarged at their lower ends at 42 and are provided with registering apertures 43 of a diameter to snugly slip over the rod 35. The said enlarged ends 42 of the flanges are normally set at a slight angle relatively to each other, or out of parallelism. They are placed on the rod when the said enlarged ends of the flanges are forced by pressure into parallelism. The tendency to spring outwardly, due to their non-parallelism, results in a pinching action between the walls of the apertures and the rod, which is sufficient to hold the brackets from sliding endwise on the rod. Each bracket is provided in its web portion with vertically spaced apertures 44—45, one of which is slotted, to receive the bolts by which the license tag 46 is attached thereto, the slotted opening giving a range of adaptability to license tags of different widths.

I claim as my invention:

1. A bumper attaching bracket provided with a rearwardly-facing bearing portion, and at the bottom of said bearing portion a rearwardly-projected and upwardly-open hook; an arm extending rearwardly from said bearing portion in a vertical fore-and-aft plane situated outwardly from said hook, and an inwardly directed hook adapted for engagement upwardly at the rear end of said arm.

2. A bumper attaching bracket provided with a vertical bearing face and with a hook adapted to engage under the front frame bar of a vehicle, and provided also with a rearwardly extending arm and a lug at the end to engage under the side member of said frame.

3. A bumper attaching bracket formed with a rearwardly facing bearing portion and with a balancing arm, the latter comprising a horizontal portion and a downwardly and rearwardly directed portion provided with a hook at the end, said bearing portion being formed with an upwardly facing lug.

4. A bumper attaching bracket formed with a rearwardly facing bearing portion and with a balancing arm, the latter comprising a horizontal portion and a downwardly and rearwardly directed portion provided with a hook at the end, said bearing portion being formed with an upwardly facing lug, and the bracket being provided in front of its bearing face with an opening to receive an attaching element.

5. A bumper attaching bracket formed with a rearwardly facing bearing and with a balancing arm provided with a laterally extending hook at the end, said bearing formed with an upwardly opening inwardly and downwardly inclined hook member.

6. A bumper attaching bracket formed with a rearwardly facing bearing and with a balancing arm having a terminal, laterally directed lug, said bearing formed with an upwardly opening inwardly and downwardly inclined hook member.

7. The combination with a vehicle frame, of bumper brackets seated at their rear ends on said frame at the sides thereof, clamping means to draw said brackets toward each other, and opposing inclined engaging portions on said frame and brackets which cooperate with said clamping means to force the engaging surfaces intimately interlocked.

8. In combination with a vehicle frame having a side bar, and a bracket rigid with the side bar at the outer side thereof; a bumper-supporting arm applied against the outer side of the side bar, and recessed to accommodate and engage the bracket; a hook which engages the inner end of the arm beyond the bracket with the side bar, extending under the latter for such engagement; a rod engaging the arm at the opposite end of the bracket from said hook and extending across the frame; means with which the rod engages at the opposite side of the frame from said side bar, and means on the rod for clamping the arm against the side bar.

9. In combination with the frame of an automobile having a side bar, and a bracket rigid with the side bar at the outer side thereof; a bumper-supporting arm applied against the outer side of the side bar and recessed to accommodate the bracket and engage above it; a hook which engages the inner end of the arm beyond the bracket with a side bar, extending under the latter for such engagement; a rod engaging the arm at the opposite side of the bracket from said hook and extending across the frame; means with which the rod engages at the opposite side of the frame from said side bar, and means on the rod for clamping the arm against the side bar, the frame having a transverse bar and the bumper supporting arm having a projection which engages under said transverse bar.

10. In combination with the frame of an automobile having side bars and a transverse bar connecting them, and brackets rigid with the side bars at the outer sides thereof, bumper supporting arms applied against the outer sides of the side bars respectively, and recessed to accommodate and engage the brackets; hook bolts engaged with the inner ends of said bumper-supporting arms, having their hook ends engaged with the side bars and extending under the latter for such engagement; nuts on the bolts outside the bumper-supporting arms for tightening said engagement; a tie rod extending across the frame in front of the transverse bar and engaging the bumper-supporting arms, and means for tightening said tie rods to clamp the bumper-supporting arms against the outer sides of the side bars.

In testimony whereof I have hereunto set my hand at Chicago, Illinois, this 12th day of October, 1917.

THOMAS I. DUFFY.